United States Patent [19]
Jones et al.

[11] Patent Number: 5,952,798
[45] Date of Patent: Sep. 14, 1999

[54] BRUSHLESS DC MOTOR ASSEMBLY CONTROL CIRCUIT

[75] Inventors: Steven C. Jones; Keith Wolford, both of Allen, Tex.

[73] Assignee: Texas Instruments Incorporated, Dallas, Tex.

[21] Appl. No.: 09/181,252

[22] Filed: Oct. 28, 1998

[51] Int. Cl.$^6$ ........................................................ H02P 1/00
[52] U.S. Cl. ........................... 318/268; 318/747; 318/254; 318/138; 318/439; 318/779
[58] Field of Search ..................................... 318/268, 747, 318/254, 138, 439, 779

[56] References Cited

U.S. PATENT DOCUMENTS

| | | | |
|---|---|---|---|
| 5,675,231 | 10/1997 | Becerra et al. | 318/138 |
| 5,825,597 | 10/1998 | Young | 318/254 |
| 5,838,127 | 11/1998 | Young et al. | 318/439 |

*Primary Examiner*—Karen Masih
*Attorney, Agent, or Firm*—J. Dennis Moore; Wade James Brady, III; Richard L. Donaldson

[57] ABSTRACT

A novel two-phase brushless motor drive assembly. The motor drive assembly is made of two parts, a motor assemble and a motor control circuit.

The motor assembly, receives a first wire providing electric power, a second wire providing a ground connection, and a third wire. The motor assembly includes, a two-phase brushless motor. It also includes a motor drive circuit, responsive to a speed control voltage signal on the third wire and the electric power on the first wire, providing drive power to the motor to drive the motor to a speed determined by the speed control voltage signal. The motor assembly also includes a sensor circuit providing a sensed speed current signal on the third wire, having a current representing the rotational speed of the motor.

The motor control circuit is coupled to the third wire, and includes a speed control circuit responsive to a speed control signal for generating the speed control voltage signal on the third wire at a voltage corresponding to a speed indicated by the speed control signal. It also includes a current sensing circuit providing a speed signal, corresponding to the sensed speed current signal on the third wire, such that the voltage of the speed control voltage signal is substantially unaffected by changes in the current of the sensed speed current signal, and such that the current of the sensed speed current signal is substantially unaffected by changes in the voltage of the speed control voltage signal.

3 Claims, 4 Drawing Sheets

BRUSHLESS DC MOTOR ASSEMBLY CONTROL CIRCUIT

TECHNICAL FIELD OF THE INVENTION

This invention relates to brushless DC motors, and more particularly relates to apparatus for the control of brushless DC motors, especially those included in functional assemblies such as fans.

BACKGROUND OF THE INVENTION

Brushless DC fans are a type of brushless DC motor assembly that are widely used for cooling a variety of electronics components and systems, including personal computers. Such fans are relatively inexpensive. The motors driving the fans require only a DC supply voltage and relatively simple control circuitry.

There is increasing desire for variable speed control of fans, since systems designers typically design for "worst case" conditions, and consequently design such fans to operate continuously at maximum speed. At maximum speed such fans are typically their noisiest, and their power consumption is also maximum. However, the systems being cooled, and their associated components, seldom operate at worst case, and, thus, the typical operation of brushless DC fans results in greater than necessary noise and power consumption.

Particular to the PC industry is the desire to control fan speed from the computer operating system based on measurement of critical temperatures within the PC, such as the processor die temperature. Controlling a fan from the operating system would provide the capability to lower fan speed under normal conditions and increase it when conditions occur which require higher cooling capacity. Further, control of fan speed using a digital to analog converter controlling a variable DC voltage would allow software or other digital control of the fan speed.

In addition, there is increased desire to actually monitor fan speed such that, e.g., an uncontrolled reduction in speed can trigger an alert to notify the system so appropriate action can be taken. To implement such fan speed monitoring requires a signal from the fan, typically called a tachometer signal, which requires an additional wire.

Presently, PC manufacturers have defined IC devices, which provide a means of controlling fan speed with various methods implemented external to the fan, while monitoring the tachometer signal with an RPM counter. In conjunction with these, it would be desirable to provide all the following criteria:

RPM control over 30% to 100% of range

RPM control using a DAC controlled variable DC voltage

RPM control method providing high power efficiency throughout RPM range

Tachometer speed signal available throughout RPM range

Minimal external components (PC system PCB)

No more than three connections to fan

Solutions have been proposed to provide variable speed control for two-phase brushless motor assemblies such as fans, while limiting the number of wires connecting to if such assemblies to three, a desirable cost saving objective. An example of such a prior art solution is disclosed in U.S. Pat. No. 4,656,553, entitled "Electronically Programmable Universal Brushless DC Fan with Integral Tracking and Locked Rotor Protection," which issued on Apr. 7, 1987, and was assigned to Comair Rotron Inc. The scheme disclosed in this patent, while maintaining three wires for connection to the motor, nonetheless requires an integrated circuit voltage regulator, e.g. an LM 317, included in the motor assembly, as well as an additional IC in the assembly to internally control the DC motor drive voltage that, in turn, controls the motor commutation. It also requires various additional circuit elements such as resistors, bipolar transistors and Zener diodes, to effect such speed control of the motor. Speed control is limited, accomplished by the selection of the value of a resistor which is connected between two of the external leads of the motor. In addition, this approach does not provide a fan speed tachometer signal, which, if added, would require a fourth wire.

Thus, this approach suffers from the disadvantages of low flexibility in the programmability of the speed of the fan and from the fact that the regulation of the motor speed is accomplished by varying the level of the DC voltage driving the fan motor windings. The arrangement operates with less efficiency than is desirable, and dissipates excessive heat from the linear voltage regulator. In addition, the size of the motor is limited, as the circuitry included in the fan motor assembly requires two ICs.

Another prior art approach is shown in FIG. 1. This approach to speed control of two-phase brushless motor assemblies involves adjusting the DC voltage to the motor, applied between the supply and ground wires. The third wire is then used for the tachometer's feedback signal. The system 10 shown in FIG. 1 consists of a two-phase brushless motor fan assembly 12 connected to a system printed circuit board ("PCB"). A control integrated circuit ("IC") 16 includes an RPM monitor 18. The RPM monitor 18 receives a tachometer ("TACH") signal on a first wire 20 from the fan 12. A digital to analog converter ("DAC") 22 on the control IC 16 provides a control voltage on line 24 to the "+" input of a differential operational amplifier 26. The level of the control voltage on line 24 corresponds to the speed at which the fan 12 is to run. The output of the operational amplifier 26 is provided on line 28 to the base of an NPN bipolar transistor 30. The collector of bipolar transistor 30 is connected to a power supply 32, while its emitter is connected to one end of a first resistor R1. The other end of resistor R1 is connected to one end of a second resistor R2, with the other end of resistor R2 being connected to ground 34. The common connection point of resistors R1 and R2 is connected by way of line 38 to the "−" input of operational amplifier 26, thus providing a feedback path so as to maintain the proper drive voltage on line 28 for bipolar transistor 30. This, in turn, provides the proper voltage on line 36 to motor fan assembly 12 under varying load conditions to line 36, such that the voltage on line 36 is equal to the DAC output voltage present on line 24 multiplied by the formula $$\frac{R1 + R2}{R2}.$$

Note that the prior art fan system 10 of FIG. 1 requires that active power drive components be placed on the system PCB. These additional components not only take up space on the printed circuit board which might otherwise be used for other components, the bipolar NPN transistor 30 also dissipate power in the form of heat that must be dealt with on the printed circuit board itself. Notice also that the motor supply voltage provided on line 36 varies in dependence on the desired speed set in DAC 22. This creates potential problems in that circuitry internal to the fan, which commutates drive to the motor phase windings and generates the tachometer signal, are powered from this same voltage source. Thus, lowering the voltage level on line 36 to reduce fan speed may cause these internal circuits to have inadequate operating voltage, leading to malfunction. In short, trying to control fan speed by adjusting an external DC supply voltage may place a lower limit on the RPM to which the fan can be controlled, due to voltage headroom requirements of the internal circuitry.

Thus, there is a desire for an approved apparatus for controlling with high power efficiency the speed of a two phase brushless motor in a functional assembly, while limiting the number of wires needed for connection to the assembly to three. It is desired to have such an arrangement having control over a wide range of motor speed. It is desired to provide such an arrangement while maintaining adequate voltage for other components in the assembly throughout the motor speed range. It is desired to provide such an arrangement while providing a tachometer motor speed signal available throughout the motor speed range. It is desired to have such an arrangement where fewer power drive components are required on the system printed circuit board to which the wires of the assembly are connected. Finally, it is desired to have such an arrangement requiring fewer components overall, including on the printed circuit board internal to the motor assembly.

SUMMARY OF THE INVENTION

The present invention provides a novel two-phase brushless motor drive assembly. The motor drive assembly is made of two parts, a motor assembly and a motor control circuit.

The motor assembly, receives a first wire providing electric power, a second wire providing a ground connection, and a third wire. The motor assembly includes a two-phase brushless motor. It also includes a motor drive circuit, responsive to a speed control voltage signal on the third wire and the electric power on the first wire, providing drive power to the motor to drive the motor to a speed determined by the speed control voltage signal. The motor assembly also includes a sensor circuit providing a sensed speed current signal on the third wire, having a current representing the rotational speed of the motor.

The motor control circuit is coupled to the third wire, and includes a speed control circuit responsive to a speed control signal for generating the speed control voltage signal on the third wire at a voltage corresponding to a speed indicated by the speed control signal. It also includes a current sensing circuit providing a speed signal, corresponding to the sensed speed current signal on the third wire, such that the voltage of the speed control voltage signal is substantially unaffected by changes in the current of the sensed speed current signal, and such that the current of the sensed speed current signal is substantially unaffected by changes in the voltage of the speed control voltage signal.

The foregoing features and advantages of the present invention will be more apparent from the following detailed description of the preferred embodiments taken in conjunction with the accompanying drawings.

DESCRIPTION OF PREFERRED EMBODIMENTS OF THE PRESENT INVENTION

Figure 1:
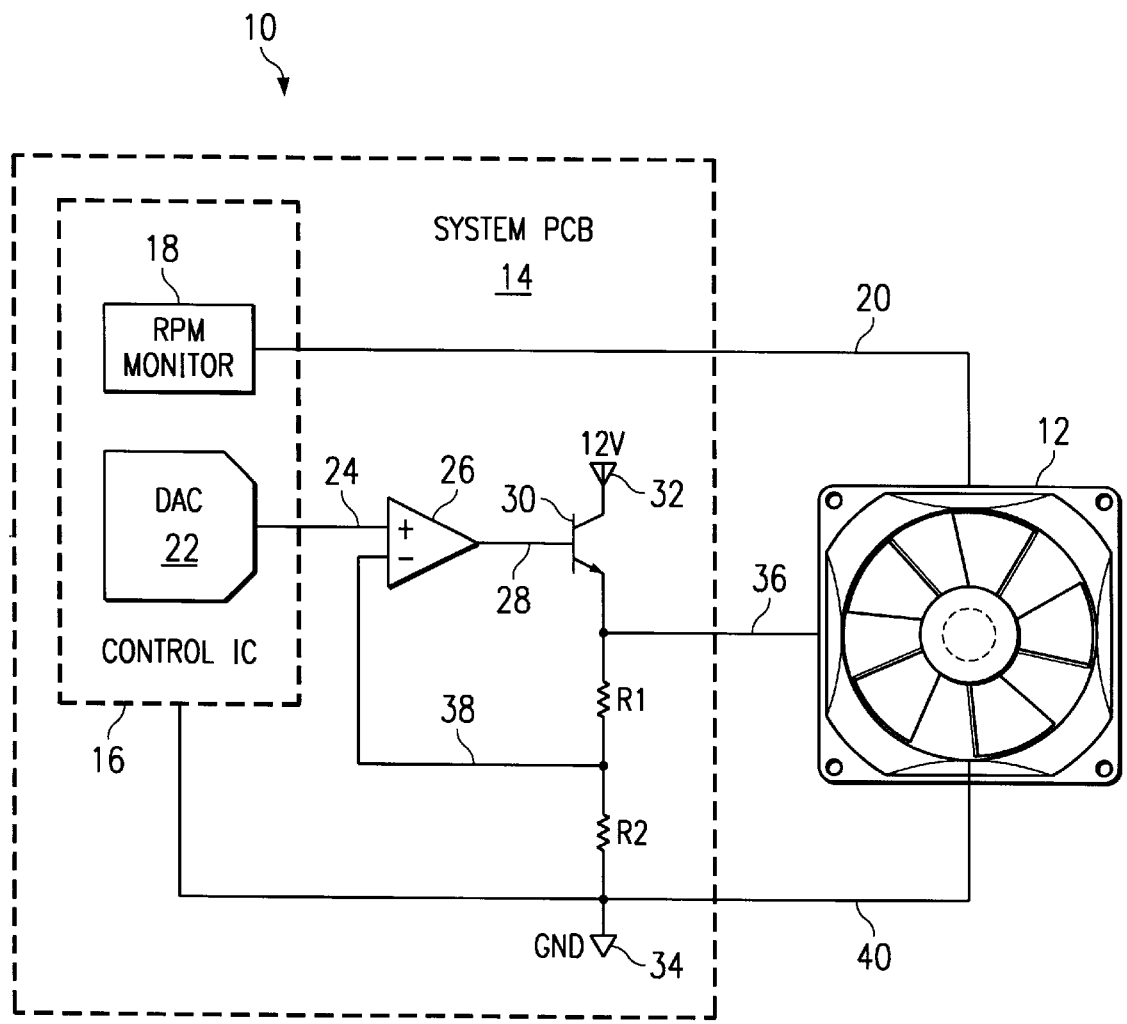
FIG. 1 is a schematic diagram of a prior art two-phase brushless motor fan assembly, with accompanying control circuit.
Figure 2:
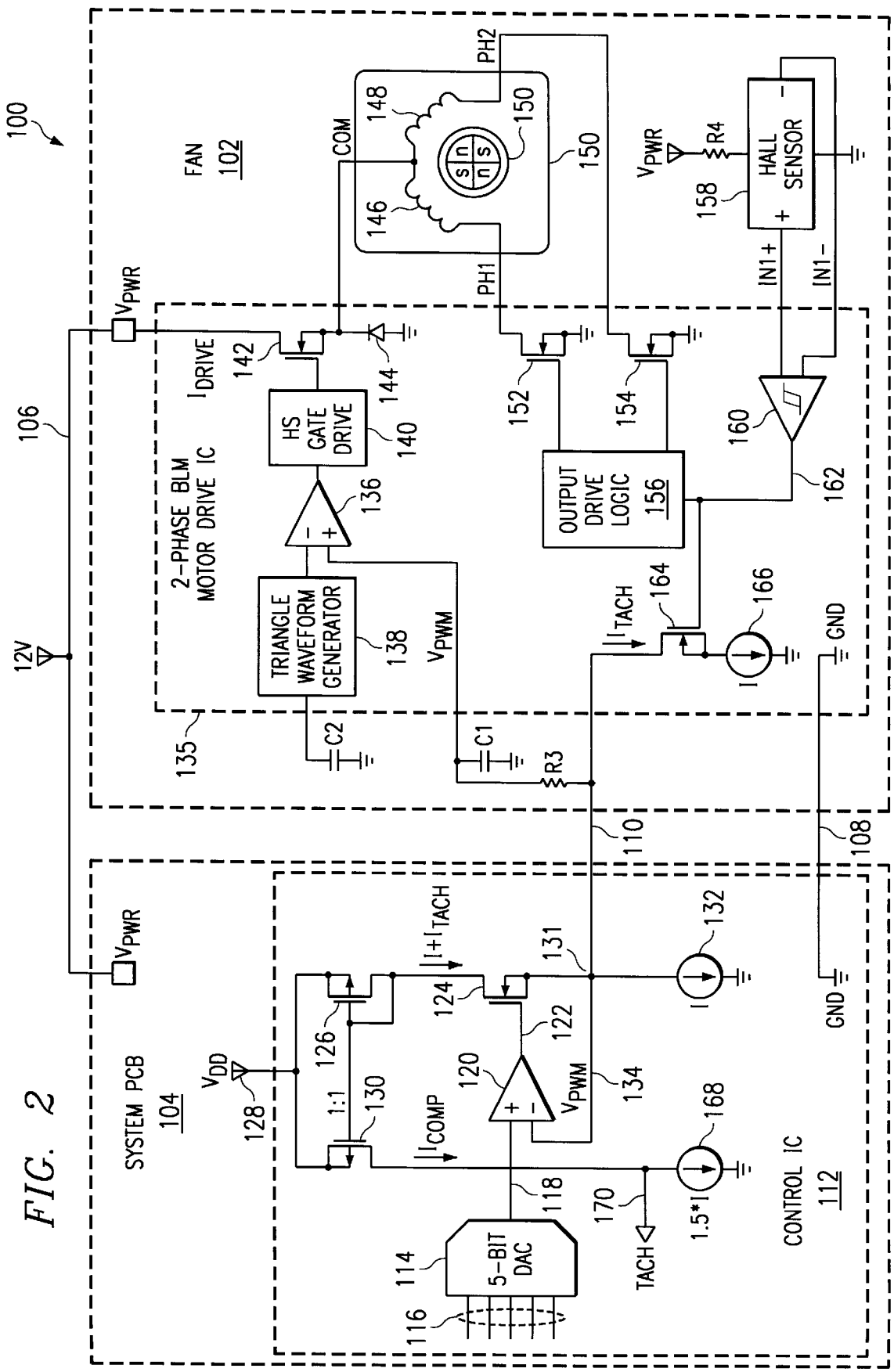
FIG. 2 is a schematic diagram of a two phase brushless motor fan assembly and accompanying control circuitry, constructed in accordance with the principles of the present invention.

FIG. 2 shows a two-phase brushless motor fan system 100 constructed in accordance with the principles of the present invention, that avoids the problems discussed above. The system 100 consists of two primary components, a system printed circuit board 104 and a fan assembly 102. Note that, as desired, the fan assembly 102 utilizes merely three wires, a power supply wire 106 providing a supply voltage, typically 12 volts, a ground wire 108, and a control signal wire 110. In the system 100, control signals are generated by the system PCB 104 and provided on line 110 to the fan assembly 102. However, not only is a control signal provided on line 110 by the system PCB 104, but in addition TACH signals generated in the fan assembly 102 are provided to the system PCB 104 by way of the same wire 110. Further, active components on the system PCB 104 operate merely at the control signal level, with all power drive components for the motor being provided in the fan assembly 102 itself.

The system PCB 104 includes a control IC 112. The control IC 112 includes an n-bit DAC 114, shown having five bits, receiving a digital value on lines 116 representing a desired speed at which the fan is to operate. This digital value on lines 116 is converted by DAC 114 to an analog signal which is provided on line 118 to the "+" input of a differential operational amplifier 120. The output of operational amplifier 120 is provided on line 122 to the gate of an NMOS device 124. The drain of device 124 is connected to the drain of a PMOS device 126 having its source connected to a $V_{dd}$ power supply 128, which is typically five volts. The gate and drain of device 126 are connected together, and the gate of device 126 is also connected to the gate of a second PMOS device 130, having its source connected to $V_{dd}$ 128. Devices 126 and 130 are thus connected in a current mirror configuration, with the mirror output, the drain of device 130, connected to ground through a fixed current sink 168 capable of sinking a current of magnitude 1.5*I. Thus, the connection of PMOS device 130, sourcing $I_{COMP}$ into the fixed current sink of 1.5*I forms a current comparator having a threshold of 1.5*I. The source of PMOS device 124 is connected to ground through a current sink 132 which is capable of sinking a current of magnitude I. A line 134 connects the common connection point, node 131, for the source of device 124 and current sink 132 to the "−" input of differential operational amplifier 120. Wire 110 connects the same node 131 to the fan assembly 102. The feedback path provided by line 134 causes differential operational amplifier 120 to maintain node 131 at a constant voltage determined by the signal value on line 118.

The voltage on node 131, $V_{pwm}$, is provided on wire 110 to the fan assembly 102. A resistor R3 is connected between wire 110 and the "+" input of a differential comparator 136. A capacitor C1 connected between the "+" input of operation amplifier 136 and ground operates in conjunction with resistor R3 to provide a low pass filter for the voltage $V_{pwm}$ prior to its being applied to the "+" input of comparator 136.

A triangle waveform generator 138 generates a triangular waveform, having a frequency controlled by a capacitor C2 connected between it and ground. The triangle waveform generated by generator 138 is supplied to the "−" input of comparator 136.

The output of comparator 136 is a pulse width modulated ("PWM") waveform, having a frequency determined by the triangle waveform generator 138 and capacitor C2, and having the pulse width determined by the level of the voltage $V_{pwm}$ on the "+" input of comparator 136. The pulses are wider with a higher level of $V_{pwm}$, and are narrower with a lower value of $V_{pwm}$. The PWM output from comparator 136 is applied to the input of a high-side ("HS") gate drive 140 which buffers the PWM output signal from comparator 136 before applying it to the gate of a high-side NMOS device 142. The drain of device 142 is connected to the power supply, $V_{pwr}$, while the source of device 142 is connected to the cathode of a diode 144, the anode of the diode being connected to ground. The source of device 142 is also connected to the common connection point COM of the two phase windings, winding 146 and winding 148 located on the stator in fan motor 150. The rotor 151 of motor 150 includes a permanent magnet interacting with the changing fields of windings 146 and 148 and causing rotation of the rotor 151. The low side connection PH1 of winding 146 is connected to the drain of a NMOS device 152, the source of device 152 being connected to ground. The low side connection PH2 of winding 148 is connected to the drain of a further NMOS device 154, the source of device 154 being connected to ground. The gates of devices 152 and 154 are connected to respective outputs of a conventional output drive logic unit 156 used with 2-phase brushless motor control.

A Hall sensor 158 is connected to $V_{pwr}$ through a resistor R4, and is connected to ground. The "+" output IN1+ of Hall sensor 158 is provided to one input of a differential comparator with hysteresis 160, while the "−" output of Hall sensor 158 IN1− is connected to the other input of comparator 160. The output of comparator 160 is provided on line 162 to the input of the output drive logic unit 156 and to the gate of an NMOS device 164. The source of NMOS device 164 is connected to one port of a current sink 166, the other port of current sink 166 being connected to ground. Current sink 166 is capable of sinking a current having a magnitude of I. The drain of NMOS device 164 is connected to wire 110. Current sink 168 is capable of sinking a current having a magnitude of 1.5*I. The common connection point for current sink 168 and the drain of device 130 is connected to a line 170 which provides a TACH output signal for utilization by other components (not shown) inside the control IC 112 or on the system PCB 104.

The system 100 of FIG. 2 operates as follows. Generation of the voltage $V_{pwm}$ in response to the provision of a digital value at the input of DAC 114 is described above. Generation of the variable PWM waveform at the output of the HS gate drive 140 in response to varying voltage levels on wire 110 is also described hereinabove. The PWM signal from output drive 140 is applied to the gate of NMOS device 142 which provides drive current $I_{DRIVE}$ to the windings 146, 148 of fan motor 150. The direction of that current to either winding 146 or 148 is controlled by the output drive logic unit 156, which alternately turns on devices 152 and 154 so as to complete the ground connection for the respective winding 146 or 148. This control function of output drive logic unit 156 is performed in response to the position and rotational speed data from the Hall sensor 158 provided on line 162, according to known principles.

The speed data on line 162 is in the form of a continuous series of pulses appearing at a rate corresponding to the rotational speed of the fan motor 150. The appearance of each such pulse at the gate of device 164 turns device 164 on. The current flowing through device 164, $I_{TACH}$, is of a magnitude substantially equal to I, from the current sinking of current sink 166. Now, this current $I_{TACH}$ is provided through wire 110 by node 131 in control IC 112. Note that, in addition to providing current $I_{TACH}$ for wire 110, node 131 also provides a current having a magnitude of I for current sink 132. Thus, the current drawn through device 124 is equal to I plus $I_{TACH}$, which is referred to compositely as $I_{COMP}$.

It will be recalled that it is stated above that device 126 and device 130 are configured as a current mirror. Therefore, the current $I_{COMP}$ flowing through device 124, which is provided by device 126, is mirrored in device 130. Current sink 168 attempts to sink this current. Now, when a pulse is appearing on line 162, $I_{TACH}$ is equal to I. Therefore, $I_{COMP}$ is substantially equal to 2*I. Current sink 168 is only capable of sinking 1.5*I, and therefore is incapable of sinking all of the current. This causes output line 170 to be pulled high, thus providing a positive going output pulse at the TACH output. On the other hand, when no pulse is appearing on line 162, $I_{TACH}$ is substantially equal to zero, i.e., it is low. Therefore, in such a case, $I_{COMP}$ is substantially equal to I. In this situation, current sink 168 is capable of sinking all of $I_{COMP}$ and therefore line 170 is pulled low, causing a low state to appear at the TACH output. In this way, the continuous stream of pulses constituting the TACH output of the Hall sensor 158 is effectively communicated across wire 110 to be made available on line 170 for other circuitry (not shown) within control IC 112 or on the system PCB 104.

Note that wire 110 is the same wire that provides the control voltage $V_{pwm}$ for controlling the speed of the fan motor 150 by controlling the pulse width modulation at comparator 136, as described above. Because of the configuration of differential operational amplifier 120, NMOS device 124 and the feedback line 134 to the negative input of operational amplifier 120, the above described operation of the communication of the TACH signal from Hall sensor 158 to line 170 has a negligible effect of the control voltage $V_{PWM}$. What effect does occur due to the finite response time of operational amplifier 120 to respond to a current level change in line 110, resulting from turning on or off $I_{TACH}$ by device 164, will be a momentary rise or drop in the line 110 voltage level. Any momentary rise or drop in the line 110 voltage is an undesirable perturbation of the $V_{PWM}$ signal to the positive input of comparator 136, resulting in momentary perturbation of PWM duty-cycle. To prevent this undesirable $V_{PWM}$ perturbation, a low-pass filter comprised of resistor R3 and capacitor C1 is connected between line 110 and the positive input of comparator 136 to filter any momentary voltage level changes at line 110.

Note that the aforementioned duplex operation of voltage control of the fan motor 150 and tachometer signal communication operates advantageously in conjunction with an onboard pulse width modulation scheme operating with high efficiency and with minimal components. This will now be described in more detail.

Figure 3:
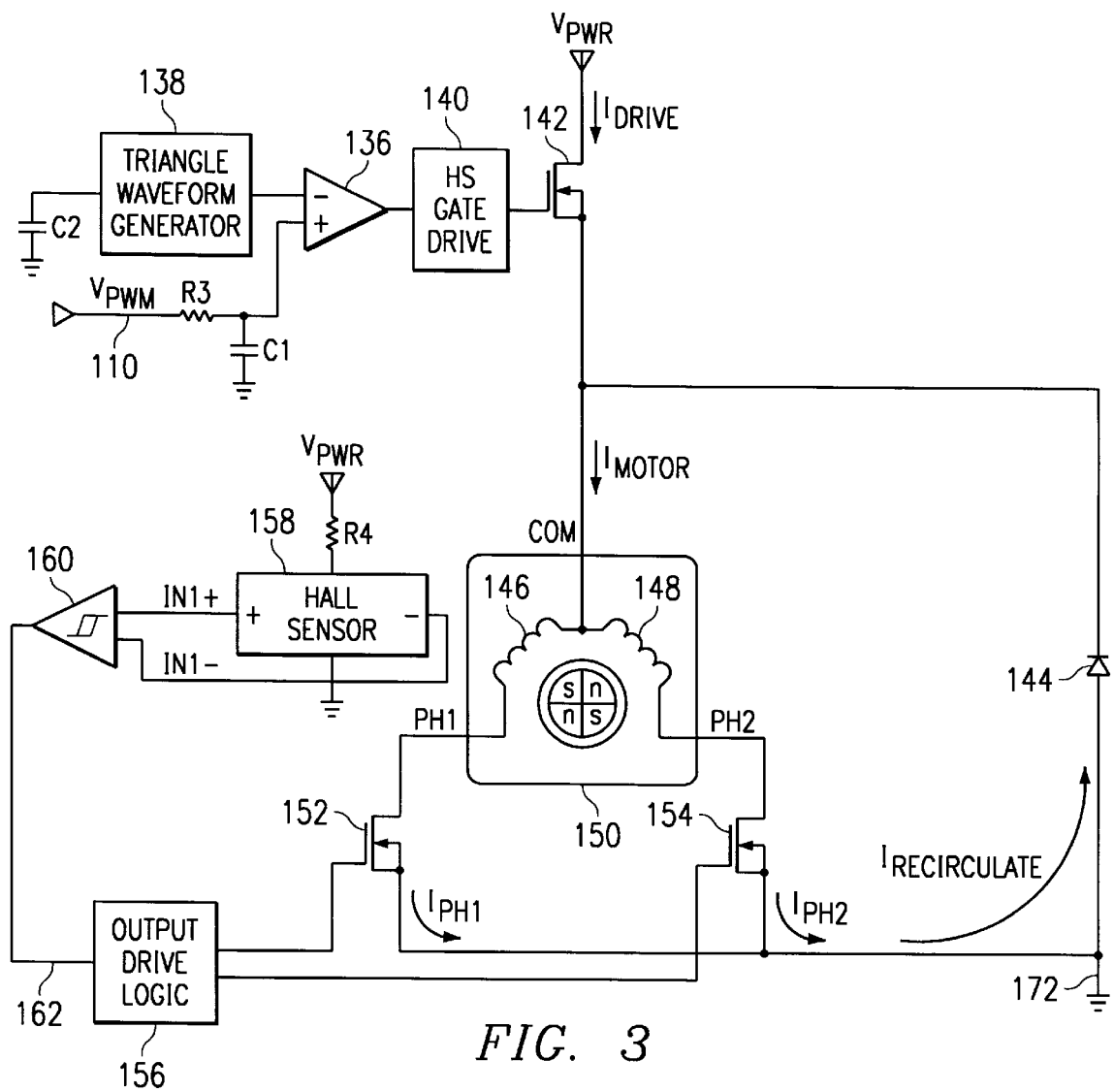
FIG. 3 is a schematic diagram of a portion of the circuitry of FIG. 2, slightly rearranged in presentation so as to facilitate a discussion of the principles of operation of such circuit.

FIG. 3 is a schematic diagram of a portion of the circuitry of FIG. 2 with some of the components arranged differently from FIG. 2 in order to facilitate a discussion of certain novel and advantageous features of the circuitry of FIG. 2.

Figure 4:
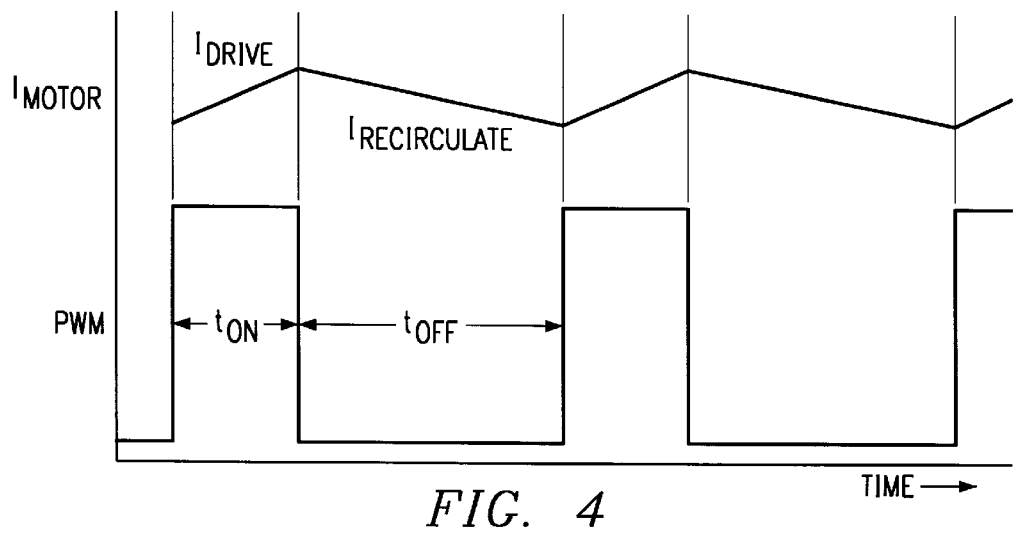
FIG. 4 is a signal diagram showing $I_{MOTOR}$ and PWM against time.

FIG. 4 is a signal timing diagram which will be referred to in the following discussion of FIG. 3. Turning now to FIG. 3, as was mentioned above, the signal delivered to the gate of device 142 by the high side gate drive 140 is a pulse width modulated (PWM) drive signal. This is shown in FIG. 4, identified as PWM. Note that in FIG. 4 the time interval during which signal PWM is ON is identified as $t_{ON}$, while the time interval during which the pulse signal PWM is OFF is identified as $t_{OFF}$.

During interval $t_{ON}$, device 142 conducts and delivers current $I_{DRIVE}$ to the motor 150. During this time interval $t_{ON}$ the motor current $I_{motor}$ is equal to $I_{DRIVE}$. As described above, under control of the output drive logic unit 156 the current $I_{motor}$ is directed to winding 146 or winding 148 at the appropriate time so as to maintain motor rotation by the output drive logic unit 156, alternately, turning on device 152 or device 154, as the case may be. During a first phase, PH1, device 152 is turned on, thus directing $I_{motor}$ through device 152 to the ground connection point 172. The flow of $I_{motor}$ during this first phase is identified as $I_{ph1}$ in FIG. 3. During a second phase of operation the current $I_{motor}$ is directed through winding 148 by the action of having device 154 turned on. During this second phase $I_{motor}$ is directed to the ground connection point 172, as shown. Because of the inductance in motor windings 146 and 148, the motor current $I_{DRIVE}$ steadily increases during $t_{ON}$, as shown in the top portion of FIG. 4.

At the end of $t_{ON}$ the drive signal PWM goes low, causing device 142 to turn off. During the time interval $t_{OFF}$ current flow is maintained in winding 146, or winding 148, as the case may be, due to the presence of diode 144. Even though diode 144 is nonconducting during the time interval $t_{ON}$ because during this interval it is reverse biased, as soon as device 142 shuts off, that is, at the beginning of the time interval $t_{OFF}$, the reverse biasing voltage $V_{pwr}$ (less VDS of device 142) is removed from the COM terminal of motor 150. Because of the inductive field dynamics of the windings 146 and 148 carrying the substantial $I_{DRIVE}$, a voltage is set up between terminal PH1 and terminal COM, or terminal PH2 and terminal COM, as the case may be, that forward biases diode 144. A path is thus established for recirculation of the current flow through the respective winding 146 or 148 so that the motor current $I_{motor}$ continues during $t_{OFF}$. This current $I_{recirculate}$ passes through diode 144 and returns to the COM terminal of motor 150, as shown in FIG. 3. The current $I_{recirculate}$ is a steadily decaying current, as shown in FIG. 4. The process continues for each pulse of signal PWM.

This important drive topology allowing for recirculation of the energy added to the motor windings is an important feature allowing use of pulse width modulation drive methodology, with its beneficial high efficiency. The novel arrangement described in conjunction with the discussion of FIG. 3 utilizes the inductance in the windings of the motor itself for filtration, and thus smoothing of the motor current $I_{motor}$. At the same time, the energy added to the motor windings during $t_{ON}$ is beneficially recirculated during $t_{OFF}$ to maintain a relatively constant current flow in the winding. As the duty cycle of the signal PWM is changed, the mean level of this current changes accordingly to control the motor torque, and thus the RPM of the motor. But, no external inductance is required to accomplish the PWM controlled power conversion.

Note that as a practical matter, the selection of the PWM signal frequency, by appropriate selection of the value of capacitance of capacitor C2, must be sufficiently above the L/R time constant of the motor winding for recirculation of the inductive energy to occur during the entire off time of the PWM cycle, resulting in the motor inductance filtering the current, as shown in FIG. 4. In addition, to avoid the possibility of audible noise from the PWM frequency, it is also suggested that this frequency be higher than 20 KHz, which is also high enough for the typical two-phase motor winding time constant to achieve the desired PWM recirculation.

Note, finally, that in the place of diode 144 a synchronous switch could be employed, as well.

Figure 5:
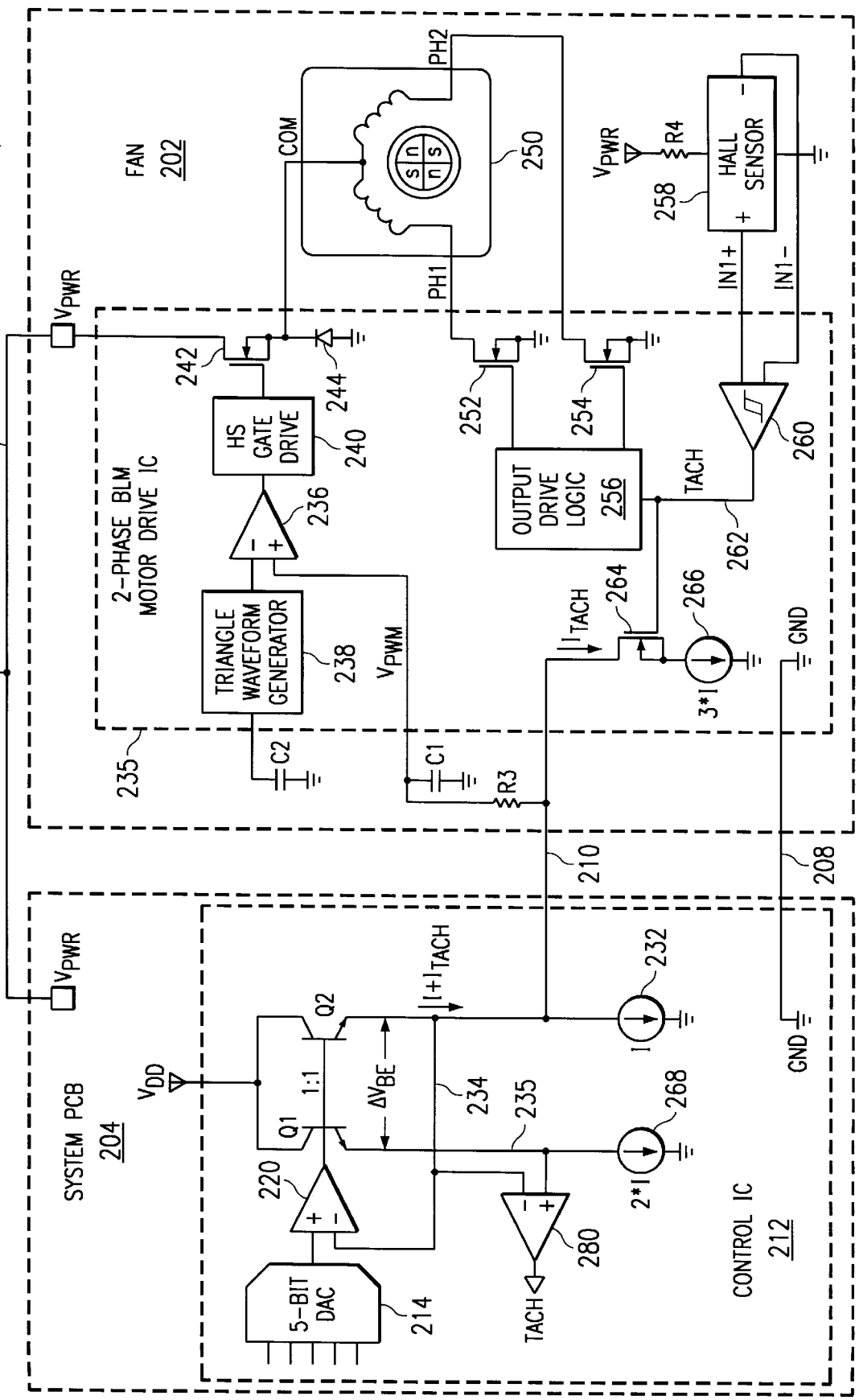
FIG. 5 is another embodiment of a two phase brushless motor fan and accompanying control circuitry, constructed in accordance with the principles of the present invention.

FIG. 5 shows a schematic diagram of another embodiment embodying the principles of the present invention. The system 200 shown in FIG. 5 comprises a system printed circuit board 204 and a fan assembly 202. As before, only three wires are required for connection to the fan assembly 202, namely wire 206 providing a power supply, typically twelve volts, wire 208 providing a ground connection, and wire 210 providing the control signal connection for the fan assembly 202. The fan assembly 202 is substantially the same as the fan assembly 102 of FIG. 2, employing a low pass filter for $V_{pwm}$ comprising resistor R3 and capacitor C1, a triangle waveform generator 238 utilizing a capacitor C2 to determine the frequency of the triangular waveform generated, a differential comparator 236, high side gate drive 240, NMOS drive device 242, diode 244 for purposes of recirculation, output drive logic 256 driving respective grounding devices 252 and 254, a Hall sensor 258 receiving power from $V_{pwr}$ through resistor R4 and driving a comparator with hysteresis 260 providing position and speed indicating signals for the output drive logic 256. The TACH signal from comparator 260 is provided to the gate of a NMOS device 264 having its source connected to ground through a current sink 266 capable of sinking 3*I current. The drain of device 264 is connected to wire 210. A current $I_{TACH}$ flows through device 264.

The primary difference between fan assembly 202 of FIG. 5 and the fan assembly 102 of FIG. 2 is the difference in the size of the current sink 266 of FIG. 5, as compared with the size of the current sink 166 in FIG. 2. The reason for this difference is described below.

In FIG. 5, the control IC 212 on the system printed circuit board 204 functions in a similar way as compared with the control IC 212 on the printed circuit board 104 of FIG. 2. However, the control IC 212 of FIG. 5 is capable of providing its function at a lower supply voltage $V_{dd}$ than the control IC 112 of FIG. 2, in the range of 3.3 volts. As before, an n-bit DAC 214 (again, here shown as a 5-bit DAC), provides a speed control signal, having a voltage corresponding to a desired speed for fan motor 250, to the "+" input of a differential operational amplifier 220. The output of operational amplifier 220 is provided to the base of a first bipolar NPN transistor Q1 which has its base connected to the base of a second bipolar NPN transistor Q2 which is identical in design to transistor Q1, and closely matched to parameters. The collector of transistor Q1 and the collector of transistor Q2 are both connected to the power supply voltage $V_{DD}$. The emitter of transistor Q2 is connected to a node 234 which is connected to ground through a current sink 232 capable of sinking a current having a magnitude of I, as well as to wire 210. The emitter of transistor Q1 is connected to a node 235 which is connected to ground through a current sink 268 capable of sinking a current having a magnitude of 2*I. The "−" input of a differential comparator 280 is connected to node 234, while the positive input of comparator 280 is connected to node 235. The output of differential comparator 280 provides the TACH signal, similar to the system of FIG. 2, for other circuitry (not shown) within control IC 212 or on the system PCB 204.

By connecting together the bases of substantially identical transistors Q1 and Q2 and forcing them to the same voltage, that of the output of operational amplifier 220, but forcing their emitter currents to 2*I and I+$I_{TACH}$, respectively, the $V_{BE}$ of transistors Q1 and Q2 differ, and thus a Δ $V_{BE}$ voltage results between the emitter of Q2 at node 234 and the emitter of Q1 at node 235. Since the negative input of differential comparator 280 is connected to node 234 and the positive input of comparator 280 is connected to node 235, comparator 280 monitors this differential voltage set up by the Δ$V_{BE}$ between the Q2 and Q1 emitters.

Now, the TACH signal on line 262 is the same as the TACH signal appearing on line 162 in FIG. 2, and therefore the discussion above describing the TACH signal applies here as well. Thus, when a pulse is present in the TACH signal on line 262, device 264 draws current $I_{TACH}$, having a magnitude of 3*I as determined by current sink 266. In response, transistor Q2 in the control IC 212 draws an emitter current $I_E$ equal to I+$I_{TACH}$ =4*I. Transistor Q1 draws only 2*I, and so the Δ $V_{BE}$ between the Q2 and Q1 emitters in this case is such that node 234 is more negative than node 235. For example, this Δ $V_{BE}$ could be −18 mV, according to the known formula of $$\Delta V_{BE} = \frac{KT}{q}\ln\frac{I_1}{I_2},$$

where
   K=Boltzmann's constant,
   T=temperature in degrees Kelvin,
   q=the charge constant,
   $I_1$=the emitter current of Q1, i.e., $I_E$, and
   $I_2$=the emitter current of Q2, i.e., $I_E$.
This drives the output of comparator 280 high.

When no pulse is present in the TACH signal on line 262 current I+$I_{TACH}$ again flows through transistor Q2, but in this case I+$I_{TACH}$=I. Transistor Q1 draws 2*I, and so the Δ $V_{BE}$ between the Q2 and Q1 emitters in this case is such that node 234 is more positive than node 235. For example, this Δ Δ $V_{BE}$ could be +18 mV. This drives the output of comparator 280 low.

In this way, the TACH signal on line 262 is effectively communicated to the system printed circuit board 204. As in the circuit of FIG. 2, to prevent the undesirable $V_{PWM}$ perturbation resulting from the voltage variations on line 210 from the changes in the $V_{BE}$ of Q2 arising from the transmission of the TACH signal from line 262 to the output of comparator 280, a low-pass filter comprised of resistor R3 and capacitor C1 is connected between line 210 and the positive input of comparator 136 to filter any momentary voltage level changes at line 110.

Also as in the circuit of FIG. 2, highly accurate control voltage signals are thus provided from the system printed circuit board 204 to the fan drive assembly 202 across wire 210, while the TACH signal is provided from the fan drive assembly 202 to the system printed circuit board 204 across the same wire 210.

Note, finally, that while the novel approach to communicating a TACH signal across the same wire as that providing a control signal to a DC brushless motor assembly has been disclosed in conjunction with the novel approach to providing PWM control of such an assembly, the same techniques disclosed herein for such TACH signal communication may be used in conjunction with other schemes for DC brushless motor assembly control. For example, it would be readily adaptable to a scheme such as that disclosed in the aforementioned U.S. Pat. No. 4,656,553, provided the input to the linear voltage regulator (e.g., the LM 317) is high impedance.

Although the present invention and its advantages have been described in detail, in conjunction with two different embodiments, it should be understood that various additional changes, substitutions and alterations can be made herein without departing from the spirit and scope of the invention as defined by the appended claims.

What is claimed is:

1. A two-phase brushless motor assembly, receiving a first wire providing electric power, a second wire providing a ground connection, and a third wire, comprising:

a two-phase brushless motor, including a rotor, and including a first winding and a second winding on a stator;

a sensor circuit providing a sensed speed signal representing at least the rotational position of said rotor; and a motor drive circuit, responsive to a speed control voltage signal on said third wire and said electric power on said first wire, providing drive power to said motor to drive said motor to a speed determined by said speed control voltage signal, said motor drive circuit comprising a pulse width modulator responsive to said speed control voltage signal for providing a pulsed motor drive control signal in pulses having a width modulated in accordance with the value of the voltage of said speed control voltage signal, a power drive circuit coupled to said first wire and responsive to said pulse width modulator for providing pulsed electric power to a common connection terminal for a first end of said first winding and for a first end of said second winding of said motor in pulses determined by said pulsed motor drive control signal, an output drive logic control circuit responsive to said sensor circuit and coupled to a second end of said first winding and to a second end of said second winding, providing a return path for said pulsed electric power through said first winding and through said second winding, alternatingly, and a circulating circuit path through ground, for conducting a circulating current through said first winding and through said second winding, during intervals between said pulses of said pulsed electric power, alternating between said first winding and said second winding.

2. A two-phase brushless motor assembly in accordance with claim 1 wherein said circulating circuit path comprises a diode connected between ground and said common connection terminal.

3. A two-phase brushless motor assembly in accordance with claim 1 wherein said circulating circuit path comprises a synchronous switch.

* * * * *